United States Patent
Hou et al.

(10) Patent No.: US 11,056,747 B2
(45) Date of Patent: Jul. 6, 2021

(54) BATTERY MODULE

(71) Applicant: CONTEMPORARY AMPEREX TECHNOLOGY CO., LIMITED, Ningde (CN)

(72) Inventors: Yuepan Hou, Ningde (CN); Kaijie You, Ningde (CN); Xingdi Chen, Ningde (CN); Yu Tang, Ningde (CN); Ziyuan Li, Ningde (CN); Jun Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 42 days.

(21) Appl. No.: 16/557,716

(22) Filed: Aug. 30, 2019

(65) Prior Publication Data
US 2020/0328385 A1 Oct. 15, 2020

(30) Foreign Application Priority Data

Apr. 12, 2019 (CN) .......................... 201920498614.5

(51) Int. Cl.
*H01M 2/00* (2006.01)
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
CPC .. H01M 2/206; H01M 2/1077; H01M 2/1083; H01M 2220/20
See application file for complete search history.

(56) References Cited

U.S. PATENT DOCUMENTS

| 2011/0293974 A1* | 12/2011 | Yoon | H01M 10/0413 |
| | | | 429/72 |
| 2013/0252053 A1* | 9/2013 | Woo | H01M 2/26 |
| | | | 429/94 |
| 2019/0067658 A1* | 2/2019 | Fujiwara | H01M 2/1241 |

FOREIGN PATENT DOCUMENTS

| EP | 2650946 A1 | 10/2013 |
| JP | 2015057759 A | 3/2015 |

OTHER PUBLICATIONS

European Patent Office, Extended European Search Report Issued in Application No. 19188819.7, dated Feb. 14, 2020, Germany, 8 pages.

* cited by examiner

*Primary Examiner* — Cynthia H Kelly
*Assistant Examiner* — Monique M Wills
(74) *Attorney, Agent, or Firm* — McCoy Russell LLP

(57) ABSTRACT

A battery module includes: a box having an inner cavity; at least two battery unit array structures, each of the at least two battery unit array structures including a plurality of battery units arranged along a length direction; and at least two support components, each of the at least two support components being fixed to a side of one of the at least two battery unit array structures in a height direction. The at least two battery unit array structures are arranged along a width direction and correspond to the at least two support components in one-to-one correspondence. The battery unit array structures and the components are disposed in the inner cavity.

11 Claims, 7 Drawing Sheets

BATTERY MODULE

CROSS-REFERENCE TO RELATED APPLICATIONS

The present application claims priority to Chinese Patent Application No. 201920498614.5, filed on Apr. 12, 2019, the content of which is incorporated herein by reference in its entirety.

TECHNICAL FIELD

The present disclosure relates to the technical field of energy storage, and in particular, to a battery module.

BACKGROUND

The power battery of the vehicle includes a box and battery units located in the box. The box is used to receive the battery units and provide support for the battery units. During assembly, the battery units are first placed into an inner cavity of the box, and then an electrical connection of each battery unit and welding of sampling lines are performed. That is, the electrical connection of the above battery units and the welding of sampling lines can be performed only in the inner cavity of the box. Therefore, it is not only inconvenient to operate, but also susceptible to influence of the box, resulting in a low connection reliability.

SUMMARY

In view of the above, the present disclosure provides a battery module, in order to solve the problems in the related art, such as the inconvenient operation and low connection reliability during the assembly of battery module.

The present disclosure provides a battery module. The battery module includes a box having an inner cavity; at least two battery unit array structures, each of the at least two battery unit array structures including a plurality of battery units arranged along a length direction; and at least two support components, each of the at least two support components being fixed to a side of one of the at least two battery unit array structures in a height direction. The at least two battery unit array structures are arranged along a width direction and correspond to the at least two support components in one-to-one correspondence. The at least two battery unit array structures and the at least two support components are disposed in the inner cavity.

In an embodiment, each of the at least two support components has a flat plate structure; the box includes at least two recessed portions; and each of the at least two support components is disposed in a corresponding one of the at least two recessed portions.

In an embodiment, each of the at least two recessed portions has a depth greater than or equal to a thickness of a corresponding one of the at least two support components.

In an embodiment, the box includes two recessed portions, and the two recessed portions are arranged along the width direction, and the box has two opposite ends along the width direction; a first rib is formed between the two recessed portions, and a second rib is form between one of the two recessed portions and a corresponding one of the two opposite ends; one of the at least two battery unit array structures abuts against the first rib and the second rib.

In an embodiment, each of the at least two support components serves as a cooling plate for the battery module.

In an embodiment, in the width direction, a distance between each of the plurality of battery units and a side wall of the box is smaller than 10 mm.

In an embodiment, the at least two battery unit array structures include a first battery unit array structure and a second battery unit array structure. The first battery unit array structure includes the plurality of battery units and a plurality of first bus bars, and the second battery unit array structure includes the plurality of battery units and a plurality of second bus bars. The a plurality of first bus bars is disposed at a side of the first battery unit array structure in the width direction, and the a plurality of second bus bars is disposed at a side of the second battery unit array structure in the width direction.

In an embodiment, each of the plurality of battery units includes a case, a cover plate and electrode terminals. The case is fixedly connected to the cover plate, and the electrode terminals are provided on the cover plate and configured to be connected to bus bars. The electrode terminals of the first battery unit array structure face towards the second battery unit array structure, and/or the electrode terminals of the second battery unit array structure face towards the first battery unit array structure.

In an embodiment, each of the plurality of battery units includes a case, a cover plate and electrode terminals. The case is fixedly connected to the cover plate, and the electrode terminals are provided on the cover plate and configured to be connected to bus bars. The electrode terminals of the first battery unit array structure face away from the second battery unit array structure, and/or the electrode terminals of the second battery unit array structure face away from the first battery unit array structure.

In an embodiment, each of the plurality of battery units includes a case and an electrode assembly disposed in the case. The electrode assembly includes a first electrode plate, a second electrode plate and a separator disposed between the first electrode plate and the second electrode plate. The first electrode plate, the second electrode plate and the separator are wound to form the electrode assembly having two flat outer surfaces that are arranged opposite to each other in the height direction; or the first electrode plate, the second electrode plate and the separator are stacked in the height direction.

In an embodiment, an adhesive is provided between each of the at least two battery unit array structures and a corresponding one of the at least two support components, in such a manner that the at least two connect battery unit array structures are fixed to the at least two support components through the adhesive.

In an embodiment, along the height direction, the box includes an upper box and a lower box disposed below the upper box, and the at least two recessed portions are disposed at the lower box.

In the present disclosure, the battery module is provided with the support component, and during the assembly of the battery module, the battery units, before being placed into the box, are fixed with the support component. In this way, the support component can provide support for each of the battery units, and can electrically connect the battery units to form the battery unit array structure. Finally, the battery unit array structure is placed into the inner cavity of the box to finish the assembly of the battery module. During the assembly of the battery module, the support component can provide support for the battery units, and thus the battery unit array structure has an increased rigidity and can be easily placed into the box.

Based on the structure of the battery module described above, instead of the assembling manner of the battery module known in the related art, the electrical connection between the battery units can be performed outside the box without the limitation of the space of the inner cavity of the box, so as to bring advantages such as convenient operation and high connection reliability.

BRIEF DESCRIPTION OF DRAWINGS

In order to more clearly illustrate the technical solutions of the embodiments of the present disclosure, the drawings used in the embodiments will be briefly described as below. The drawings described below are merely some embodiments of the present disclosure. Based on these drawings, those skilled in the art can obtain other drawings without paying creative efforts.

REFERENCE NUMBER

Figure 1:
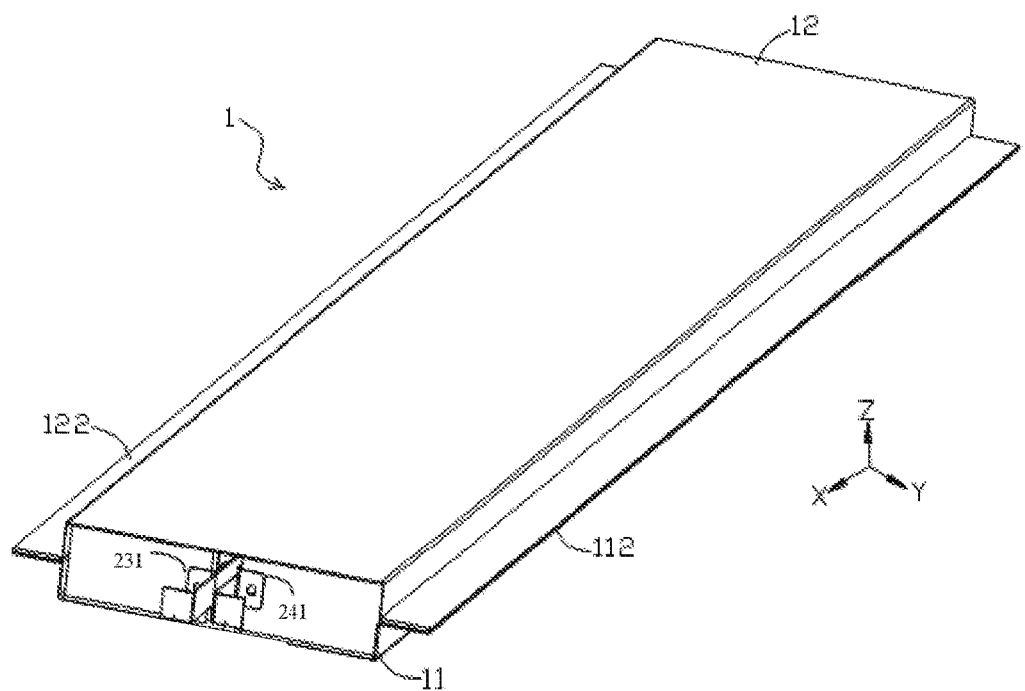
FIG. 1 is a structural schematic diagram of a battery module according to an embodiment of the present disclosure.

1 box
11 lower box
111 bottom plate
111*a* recessed portion
111*b* first rib
111*c* second rib
112 first connecting portion
12 upper box
121 top plate
122 second connecting portion
2 battery unit array structure
21 support component
22 battery unit
221 electrode assembly
221*a* first electrode plate
221*b* second electrode plate
221*c* separator
222 case
222*a* first surface
222*b* second surface
222*c* third surface
223 cover plate
223*a* first electrode terminal
223*b* second electrode terminal
224 connecting plate
23 first battery unit array structure
231 first bus bar
24 second battery unit array structure
241 second bus bar

DESCRIPTION OF EMBODIMENTS

For better understanding the technical solutions of the present disclosure, the embodiments of the present disclosure will be described in detail below with reference to the accompanying drawings.

It should be understood that, the described embodiments are merely parts of, rather than all of the embodiments of the present disclosure. Based on these embodiments described in the present disclosure, other embodiments obtained by those skilled in the art without paying creative efforts shall fall within the protection scope of the present disclosure.

The terms in the embodiments of the present disclosure are merely used for describing specific embodiments, but not intended to limit the present disclosure. The singular forms such as "a", "an", "said" and "the" are also intended to include the plural forms, unless the context indicates otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 2:
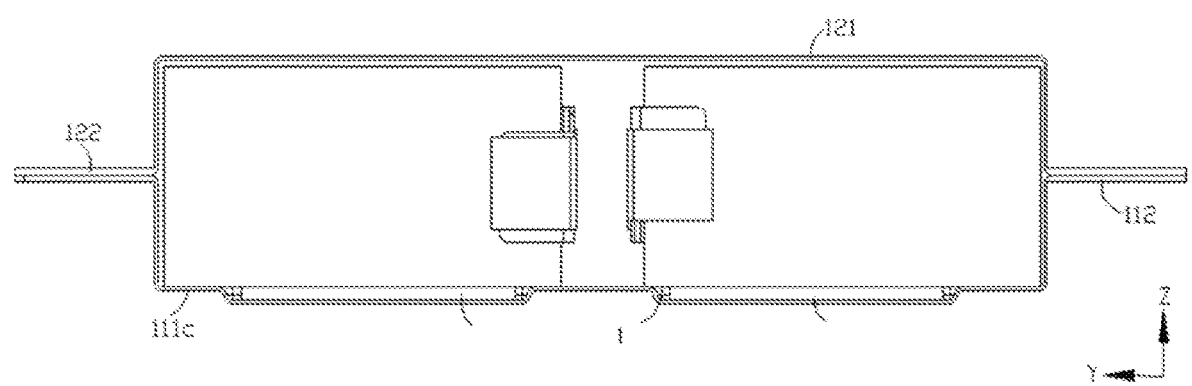
FIG. 2 is a side view of FIG. 1.
Figure 3:
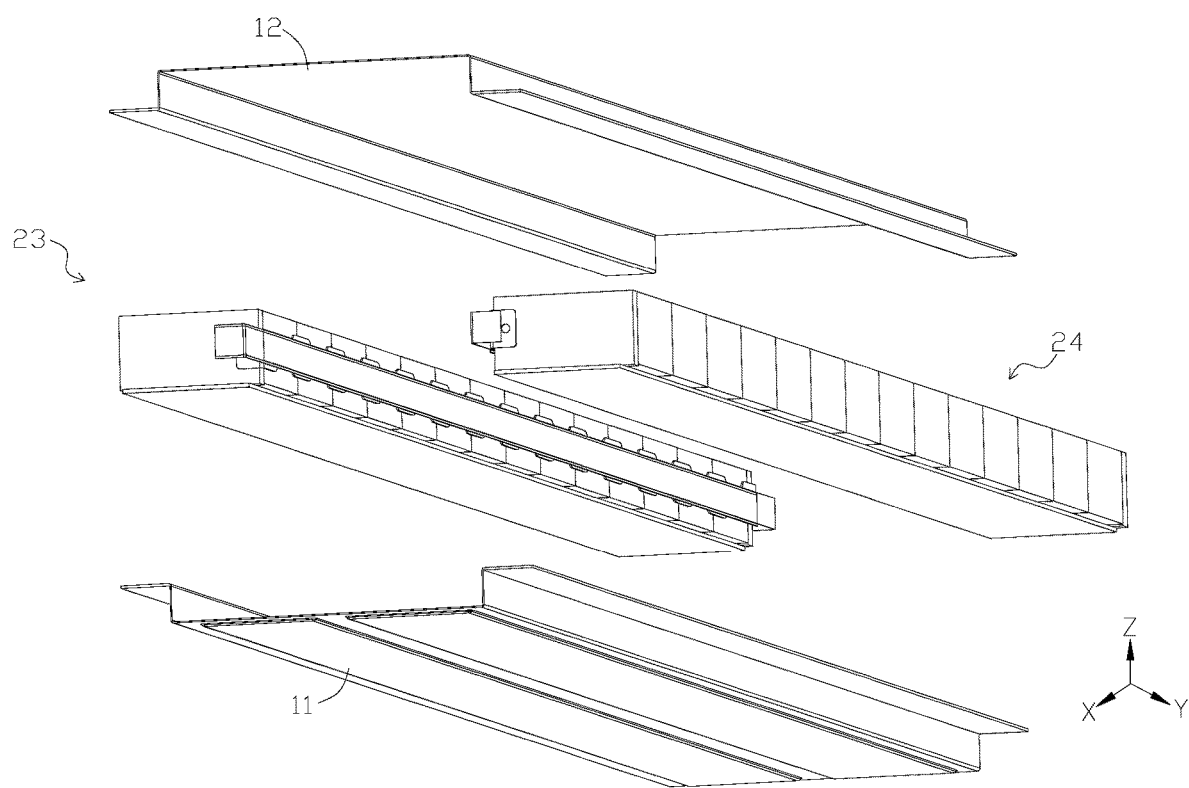
FIG. 3 is an exploded view of FIG. 1.
Figure 4:
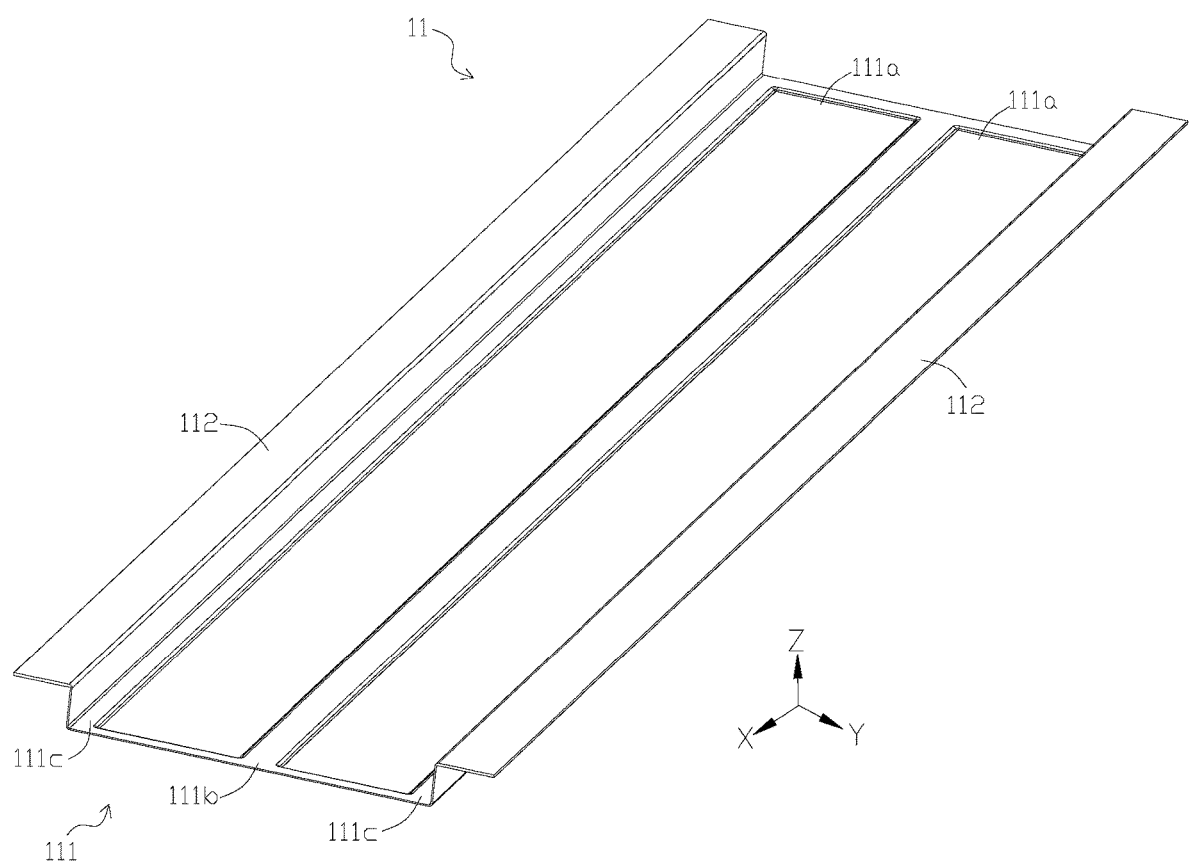
FIG. 4 is a structural schematic diagram of a lower box of FIG. 3.
Figure 5:
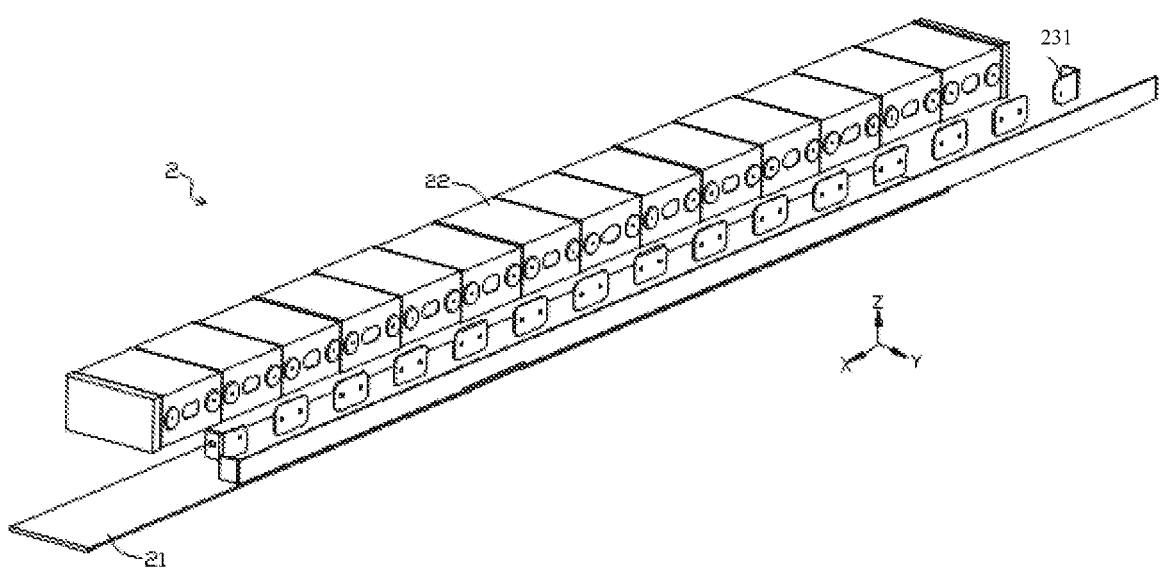
FIG. 5 is an exploded view of a battery unit array structure of FIG. 3.
Figure 6:
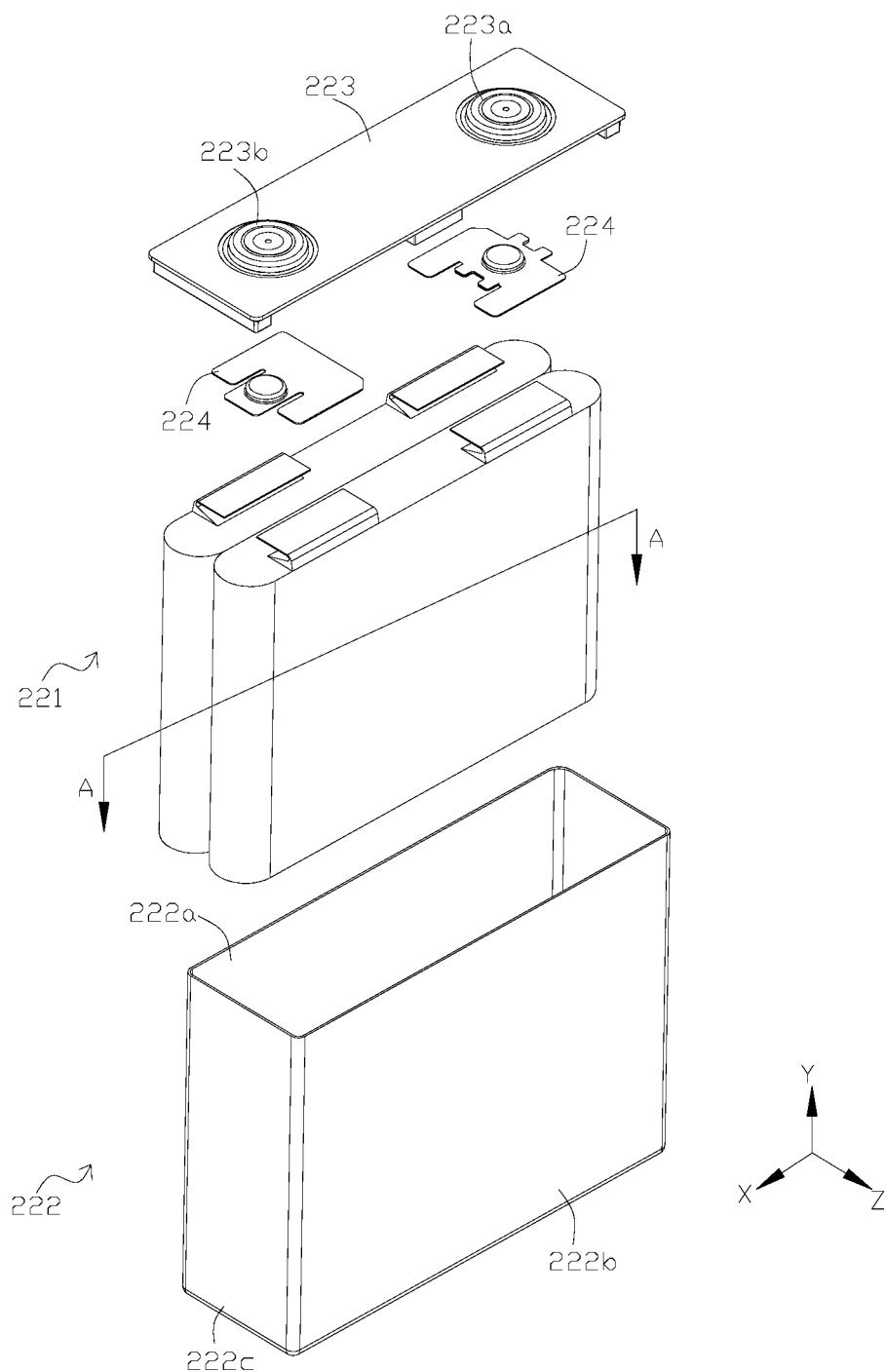
FIG. 6 is an exploded view of a battery unit of FIG. 5.
Figure 7:
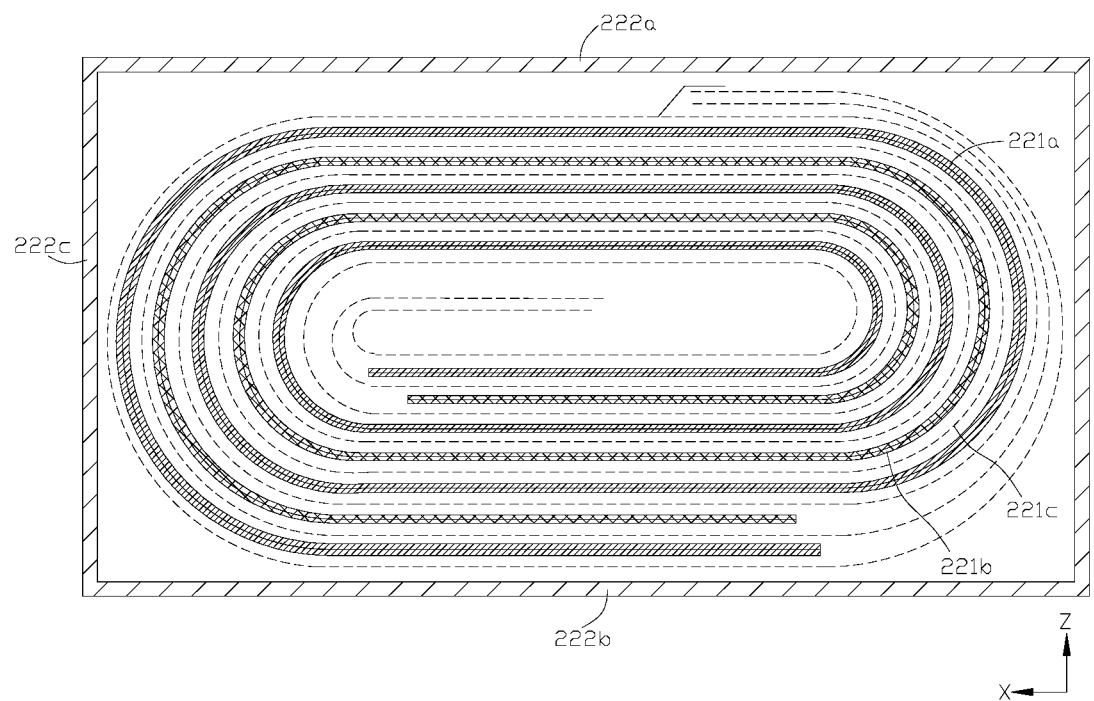
FIG. 7 is a cross-sectional view of an electrode assembly according to a first embodiment of the present disclosure along A-A of FIG. 6.
Figure 8:
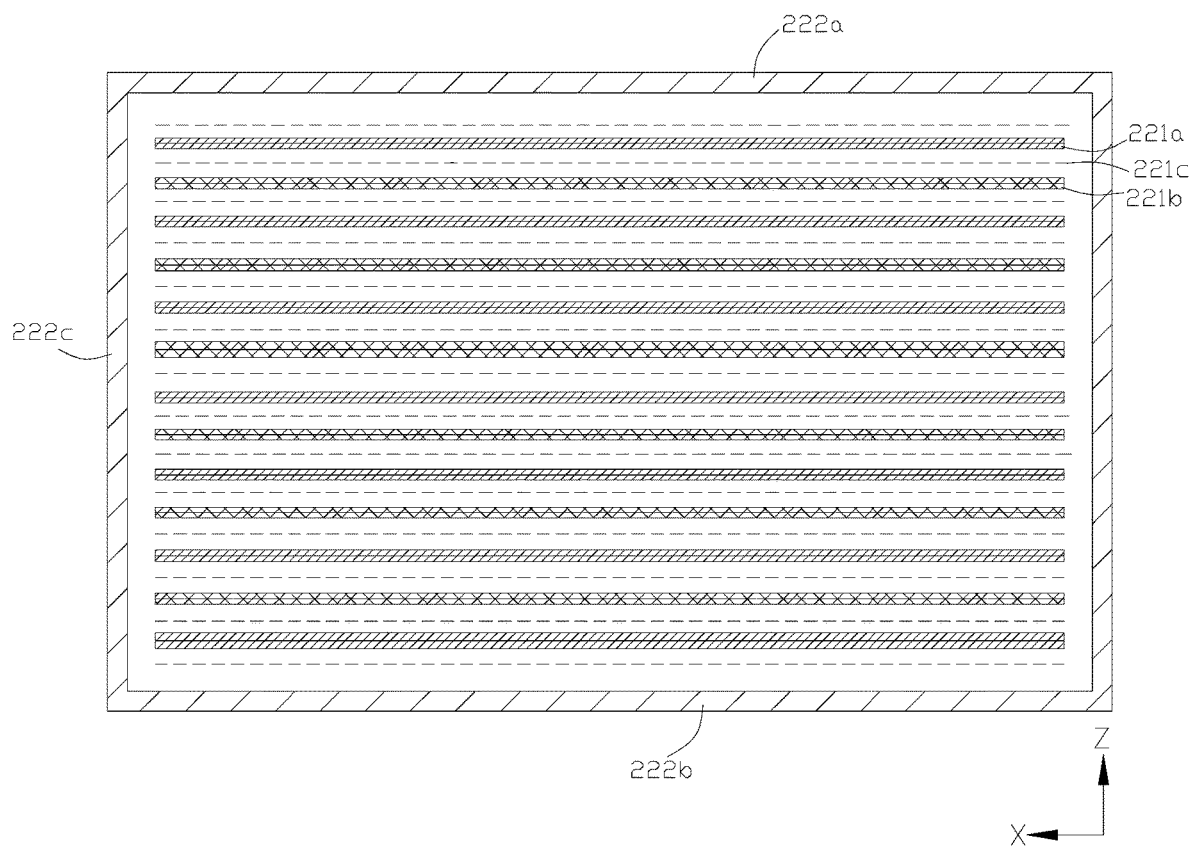
FIG. 8 is a cross-sectional view of an electrode assembly according to a second embodiment of the present disclosure along A-A of FIG. 6.

Referring to FIG. 1 to FIG. 8, FIG. 1 is a structural schematic diagram of a battery module according to an embodiment of the present disclosure, FIG. 2 is a side view of FIG. 1, FIG. 3 is an exploded view of FIG. 1, FIG. 4 is a structural schematic diagram of a lower box of FIG. 3, FIG. 5 is an exploded view of a battery unit array structure of FIG. 3, FIG. 6 is an exploded view of a battery unit of FIG. 5, FIG. 7 is a cross-sectional view of an electrode assembly according to a first embodiment of the present disclosure along A-A of FIG. 6, and FIG. 8 is a cross-sectional view of an electrode assembly according to a second embodiment of the present disclosure along A-A of FIG. 6.

As shown in FIG. 3, the present disclosure provides a battery module. The battery module includes a box 1 having an inner cavity, and a battery unit array structure 2. The battery unit array structure 2 includes a plurality of battery units 22 arranged in a length direction X.

It should be noted that the "length direction" herein refers to a direction same as an arrangement direction of the battery units 22 in the battery unit array structure 2. The length direction changes with a change of the arrangement direction of the battery units 22. Therefore, the terms of "length direction" and the like should not be construed as a limitation of the scope of the present disclosure.

As shown in FIG. 5, the battery module further includes a support component 21 fixed to one side of the battery unit array structure 2 in a height direction Z. The battery module includes at least two battery unit array structures 2 and the at least two support components 21. The at least two battery unit array structures 2 are arranged in a width direction Y, and are respectively disposed correspondingly to the at least two support components 21. The battery unit array structures 2 and the support components 21 are located in the inner cavity of the box 1.

In the present disclosure, the battery module is provided with the support component 21, and during the assembly of the battery module, the battery units 22, before being placed into the box 1, are fixed with the support component 21. In this way, the support component 21 can provide support for the battery units 22. The battery units 22 are then electrically connected to one another to form the battery unit array structure 2. Finally, the battery unit array structure 2 is placed into the inner cavity of the box 1 to complete the assembly of the battery module. During the assembly of the battery module, the support component 21 functions to support the battery units 22, and thus the battery unit array structure 2 has an increased rigidity and can be easily placed into the box 1.

Based on the structure of the battery module described above, instead of the assembling manner of the battery module known in the related art, the electrical connection between the battery units 22 can be performed outside the box 1 without the limitation of the space of the inner cavity of the box 1, so as to bring advantages such as convenient operation and high connection reliability.

In the embodiment shown in FIG. 3, the box 1 includes an upper box 12 and a lower box 11 that are fixedly connected. The upper box 12 includes a top plate 121 and a second connecting portion 122, and the lower box 11 includes a bottom plate 111 and a first connecting portion 112. The upper box 12 and the lower box 11 are fixedly connected through the first connecting portion 112 and the second connecting portion 122 to define the inner cavity of the box 1.

For example, as shown in FIG. 5, the support component 21 has a structure of flat plate, and each of the battery units 22 is fixed to a plate surface of the support component 21. In addition, as shown in FIG. 4, the box 1 has at least two recessed portions 111*a*, and each of the at least two support components 21 is located in a corresponding one recessed portion 111*a*.

In the embodiment shown in FIG. 3, the recessed portions 111*a* are provided in the bottom plate 111 of the lower box 11. It is also possible that the recessed portions 111*a* are provided in the top plate 121 of the upper box 12.

In this embodiment, when the support component 21 is located in the recessed portion 111*a* of the box 1, the battery unit array structure 2 can have a reduced height after being placed into the inner cavity of the box 1, thereby reducing a size of the battery module in the height direction Z and increasing the energy density of the battery module.

A depth of the recessed portion 111*a* is greater than or equal to a thickness of the support component 21, such that the entire support component 21 can be received in the recessed portion 111*a*, thereby further reducing the size of the battery module in the height direction Z and increasing the energy density.

In a specific embodiment, as shown in FIG. 4, the box 1 has two recessed portions 111*a* arranged in the width direction Y, and a first rib 111*b* is formed between adjacent recessed portions 111*a*. In addition, the box 1 further has two end portions disposed opposite to each other in the width direction Y, and a second rib 111*c* is formed between the recessed portion 111*a* and the corresponding end portion. Therefore, when the support component 21 is located in the recessed portion 111*a*, two ends of the battery unit array structure 2 in the width direction Y abuts against the first rib 111*b* and the second rib 111*c*, and the two ribs can support the battery unit array structure 2 and increase a contact area between the battery unit array structure 2 and the inner wall of the box 1, thereby improving the stability of the battery unit array structure 2 inside the box 1.

In this embodiment, a dimension of the support component 21 in the width direction Y is smaller than a dimension of the battery unit 22 in the width direction Y. That is, when the battery unit 22 are fixed to the support component 21, the battery unit 22 has at least one end in the width direction Y protruding beyond the support component 21, and the protruding portion abuts against the first rib 111*b* and/or the second rib 111*c*. In addition, since the support component 21 has the smaller dimension in the width direction Y, the weight of the support component 21 can be reduced, thereby enhancing the energy density of the battery module.

In addition, when the depth of the recessed portion 111*a* is equal to the thickness of the support component 21, the support component 21, after being placed into the recessed portion 111*a*, has an upper end surface flush with end surfaces of the first and second ribs. In this case, the largest contact area between the battery unit array structure 22 and box 1 and the highest stability can be achieved.

For example, as shown in FIGS. 3 and 4, the recessed portion 111*a* has a bottom wall protruding towards the outside of the box 1, and thus the bottom wall has the substantially same thickness as other portions of the box 1, so as to ensure the higher strength and rigidity of the recessed portion 111*a*.

In the above embodiments, the battery module further includes at least two water-cooling plates. Each water-cooling plate has a fluid passage therein, and a coolant circulates in the fluid passage to exchange heat with the battery units 22, thereby cooling the battery units 22. The water-cooled plates are the above support components 21.

In the present embodiment, the water-cooling plate is not only used to cool the battery units 22, but also to provide support for the battery units 22 for facilitating transfer of the battery unit array structure 2 and the assembly of the battery module. Therefore, it is unnecessary to provide an additional structure as a support component, thereby reducing the number of components of the battery module and increasing the energy density of the battery module.

In another aspect, in the above embodiments, in the width direction Y, a distance between the battery units 22 and the side wall of the box 1 is smaller than 10 mm. In other words, there is no side plate disposed between the battery units 22 and the side wall of the box 1. Therefore, compared with the existing battery packs, no side plate is provided between the battery units 22 and the side walls of the box 1, thereby further improving the energy density of the battery module in the present disclosure.

The battery units 22 abut against the side wall of the box 1. In this embodiment, when the battery units 22 abut against the side wall of the box 1, the movement of the battery units 22 in the width direction can be further restricted, thereby improving the stability of the battery unit array structure 2 in the box 1.

In the present disclosure, along the width direction Y, the battery units 22 can also not abut against the side wall of the box 1, i.e., there is a gap therebetween. Since the support component 21 is located in the recessed portion 111*a* of the box 1, the recessed portion 111*a* can restrict the movement of the support component 21 along the width direction Y, and thus further indirectly restrict the movement of the battery units 22 along the width direction Y. In this way, even the battery units 22 are not in contact with the side wall of the box 1, the position of the battery units 22 in the width direction Y can also be limited.

In the above embodiments, as shown in FIG. 3, the battery module can include two battery unit array structures 2, i.e., a first battery unit array structure 23 and a second battery unit array structure 24. As shown in FIGS. 1 and 5, the first battery unit array structure 23 includes a plurality of battery units 22 and a first bus bar 231, and the first bus bar 231 extends along the length direction X and is electrically connected to each battery unit 22. The second battery unit array structure 24 includes a plurality of battery units 22 and a second bus bar 241, and the second bus bar 241 extends along the length direction X and is electrically connected to each battery unit 22. In the battery module, the bus bar is configured to form the electrical connection between the respective battery units 22 in series, in parallel or in parallel-series.

As shown in FIGS. 1 and 5, the first bus bar 231 is disposed on one side of the first battery unit array structure 23 in the width direction Y, and the second bus bar 241 is disposed on one side of the second battery unit array structure 24 in the width direction Y.

As shown in FIG. 3, in the battery module, an electrical connection structure (including the bus bar and the electrode terminal, etc.) of the battery units 22 is located in the width direction Y of the battery module, and does not occupy the space of the battery module along the height direction Z, thereby reducing the size of the battery module in the height direction Z. Therefore, the battery module is adapted to a mounting environment with limited space in the height direction.

As shown in FIG. 6, the battery unit 22 includes a case 222, a cover plate 223, and electrode terminals. The electrode terminals include a first electrode terminal 223a and a second electrode terminal 223b. One of the two electrode terminals is a positive electrode terminal of the battery unit 22, and the other one is the negative electrode terminal of the battery unit 22. The case 222 is fixedly connected to the cover plate 223, and the electrode terminals are disposed on the cover plate 223 for electrically connecting with the corresponding bus bars. In the embodiment shown in FIG. 1 to FIG. 3, the electrode terminal of the first battery unit array structure 23 faces towards the second battery unit array structure 24, and/or the electrode terminal of the second battery unit array structure 24 faces towards the first battery unit array structure 23. The case 222 can be made of a metal material or a plastic material. When the case 222 is made of a metal material, the battery unit 22 further includes an insulating layer covering an outer surface of the case 222 for insulating the case 222 from the box 1. For example, the insulating layer has a thickness smaller than 1 mm.

In another embodiment (not shown), the electrode terminal of the first battery unit array structure 23 faces away from the second battery unit array structure 24, and/or the electrode terminal of the second battery unit array structure 24 faces away from the first battery unit array structure 23.

Both the two embodiments described above can form the electrical connection between respective battery units 22. However, when the electrode terminal of the first battery unit array structure 23 faces towards the second battery unit array structure 24 and the electrode terminal of the second battery unit array structure 24 faces towards the first battery unit array structure 23, a distance between the two bus bars is relatively small, and thus a distance between the electrode terminals of the two battery unit array structures 2 is also relatively small, which facilitates the electrical connection and enhances the energy density of the battery module.

As shown in FIG. 6, the battery unit 22 further includes one or more electrode assemblies 221 located inside the case 222. The electrode terminals of the battery unit 22 are electrically connected to tabs through connecting plates 224. The electrode assembly 221 includes a first electrode plate 221a, a second electrode plate 221b, and a separator 221c. One of the first electrode plate 221a and the second electrode plate 221b is a positive electrode plate, and the other one is a negative electrode plate. The separator 221c is disposed between the first electrode plate 221a and the second electrode plate 221b, and used for achieving the electrical insulation therebetween.

The case 222 of the battery unit 22 is in a hexahedral structure having an opening, and includes a first surface 222a, a second surface 222b, and a third surface 222c. The first surface 222a and the second surface 222b are arranged opposite to each other along the height direction Z of the battery module. That is, the first surface 222a and the second surface 222b are side surfaces of the battery unit described above and have larger areas. The third surface 222c is perpendicular to the length direction X of the battery module.

In the embodiment shown in FIG. 7, the electrode assembly 221 has a wound structure, in which the first electrode plate 221a, the second electrode plate 221b, and the separator 221c all have strip-shaped structures. During the formation of the electrode assembly 221, the first electrode plate 221a, the second electrode plate 221b, and the separator 221c are sequentially stacked and wound two or more times, in such a manner that the electrode assembly 221 has a flat structure.

In the embodiment shown in FIG. 7, the electrode assembly 221 includes two flat surfaces as outer surfaces, and the two flat surfaces are disposed opposite to each other along the height direction Z. That is, the flat surfaces of the electrode assembly 221 are disposed opposite to the first surface 222a of the case 222. The flat surfaces are substantially parallel with a winding axis, and they are the largest surfaces of the electrode assembly 221, i.e., larger than two narrow surfaces of the electrode assembly 221 distributed along the length direction X. In the present disclosure, the flat surface is unnecessary to be a strictly flat plane.

In another embodiment shown in FIG. 8, the electrode assembly 221 has a laminated structure. During the formation of the electrode assembly 221, the first electrode plate 221a, the second electrode plate 221b, and the separator 221c are sequentially stacked in a direction same as the height direction Z of the battery module.

In the above two embodiments, the electrode assembly 221 expands in a thickness direction of the electrode plate during charging and discharging. For example, in the wound electrode assembly 221 shown in FIG. 7, there is the greatest expansion force in a direction perpendicular to the flat surface (i.e., in the height direction Z). In the laminated electrode assembly 221 shown in FIG. 8, the greatest expansion force is in a stacking direction (i.e., in the height direction Z) of the first electrode plate 221a, the second electrode plate 221b, and the separator 221c. In the battery unit array structure 2, the battery units 22 are arranged along the length direction X. In other words, the battery unit array structure 2 has a larger size in the length direction X than in the height direction Z. Therefore, in the arrangement of battery units 22 according to the present disclosure, the direction of the greatest expansion force is perpendicular to the direction in which the battery units 22 are arranged, thereby preventing the battery units 22 from generating a great expansion force along the length direction X.

Further, as described above, in the electrode assembly 221 shown in FIG. 7, the surface having the largest area is a surface perpendicular to the height direction Z. Similarly, in the electrode assembly 221 shown in FIG. 8, the surface having the largest area is also a surface perpendicular to the height direction Z. Correspondingly, in the battery unit 22, the first surface 222a (the surface perpendicular to the height direction Z) of the case 222 is the surface having the largest area. Therefore, in the battery module, the largest surface of the battery unit 22 is fixed to the support component 21, and thus there is a large contact area therebetween, thereby improving the connection reliability of the battery unit 22 and the support component 21.

Further, an adhesive is provided between the battery unit array structure 2 and the support component 21, and each battery unit 22 is fixed to the support component 21 by the adhesive.

As described above, in the battery unit 22, the electrode assembly 221 has the maximal expansion force in the height direction Z. Under the expansion force, the battery unit 22 and the support component 21 can be compacted, thereby improving the bonding reliability thereof.

The above embodiments of the present disclosure are merely preferable embodiments, but not intended to limit the scope of the present disclosure. Any changes, equivalent substitutions or improvements made upon the concept of the present disclosure should fall into the protection scope of the present disclosure.

The invention claimed is:

1. A battery module, comprising:
a box having an inner cavity;
at least two battery unit array structures, each of the at least two battery unit array structures comprising a plurality of battery units arranged along a length direction (X); and
at least two support components, each of the at least two support components being fixed to a side of one of the at least two battery unit array structures in a height direction (Z),
wherein the at least two battery unit array structures are arranged along a width direction (Y) and correspond to the at least two support components in one-to-one correspondence, and
the at least two battery unit array structures and the at least two support components are disposed in the inner cavity,
each of the at least two support components has a flat plate structure, and
the box comprises at least two recessed portions, and each of the at least two support components is disposed in a corresponding one of the at least two recessed portions.

2. The battery module according to claim 1, wherein each of the at least two recessed portions has a depth greater than or equal to a thickness of a corresponding one of the at least two support components.

3. The battery module according to claim 1, wherein the box comprises two recessed portions, and the two recessed portions are arranged along the width direction (Y), and the box has two opposite ends along the width direction (Y),
a first rib is formed between the two recessed portions, and a second rib is form between one of the two recessed portions and a corresponding one of the two opposite ends, and
one of the at least two battery unit array structures abuts against the first rib and the second rib.

4. The battery module according to claim 1, wherein each of the at least two support components serves as a cooling plate for the battery module.

5. The battery module according to claim 1, wherein in the width direction (Y), a distance between each of the plurality of battery units and a side wall of the box is smaller than 10 mm.

6. The battery module according to claim 1, wherein the at least two battery unit array structures comprise a first battery unit array structure and a second battery unit array structure,
wherein the first battery unit array structure comprises the plurality of battery units and a plurality of first bus bars, and the second battery unit array structure comprises the plurality of battery units and a plurality of second bus bars, and
the plurality of first bus bars is disposed at a side of the first battery unit array structure in the width direction (Y), and the plurality of second bus bars (241) is disposed at a side of the second battery unit array structure (24) in the width direction (Y).

7. The battery module according to claim 1, wherein each of the plurality of battery units comprises a case, a cover plate and electrode terminals,
the case is fixedly connected to the cover plate, and the electrode terminals are provided on the cover plate and configured to be connected to bus bars,
the first battery unit array structure comprises the plurality of battery units and a plurality of first bus bars, and the second battery unit array structure comprises the plurality of battery units and a plurality of second bus bars;
the electrode terminals of the first battery unit array structure face towards the second battery unit array structure, and/or the electrode terminals of the second battery unit array structure face towards the first battery unit array structure.

8. The battery module according to claim 1, wherein each of the plurality of battery units comprises a case, a cover plate and electrode terminals,
the case is fixedly connected to the cover plate, and the electrode terminals are provided on the cover plate and configured to be connected to bus bars,
the first battery unit array structure comprises the plurality of battery units and a plurality of first bus bars, and the second battery unit array structure comprises the plurality of battery units and a plurality of second bus bars;
the electrode terminals of the first battery unit array structure face away from the second battery unit array structure, and/or the electrode terminals of the second battery unit array structure face away from the first battery unit array structure.

9. The battery module according to claim 1, wherein each of the plurality of battery units comprises a case and an electrode assembly disposed in the case,
the electrode assembly comprises a first electrode plate, a second electrode plate and a separator disposed between the first electrode plate and the second electrode plate,
the first electrode plate, the second electrode plate and the separator are wound to form the electrode assembly having two flat outer surfaces that are arranged opposite to each other in the height direction (Z); or the first electrode plate, the second electrode plate and the separator are stacked in the height direction (Z).

10. The battery module according to claim 9, wherein an adhesive is provided between each of the at least two battery unit array structures and a corresponding one of the at least two support components, in such a manner that the at least two connect battery unit array structures are fixed to the at least two support components through the adhesive.

11. The battery module according to claim 1, wherein along the height direction (Z), the box comprises an upper box and a lower box disposed below the upper box, and
the at least two recessed portions are disposed at the lower box.

* * * * *